May 6, 1969      F. CELORIO      3,442,228
AUTOMATIC DOUGH FEEDING MACHINE
Filed March 24, 1967      Sheet 3 of 4
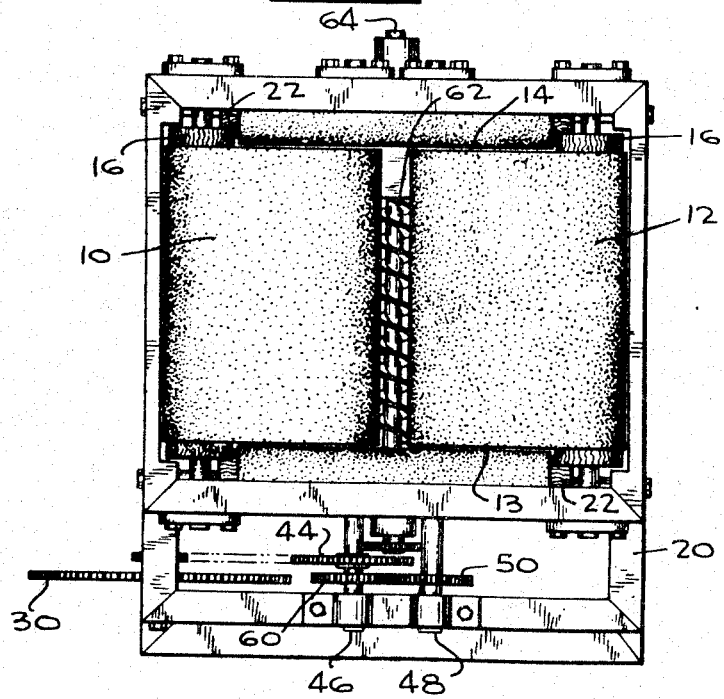
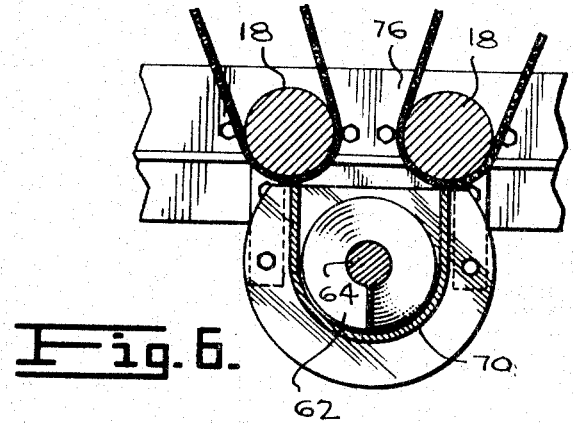
INVENTOR
FAUSTO CELORIO
BY Mason, Fenwick & Lawrence
ATTORNEYS

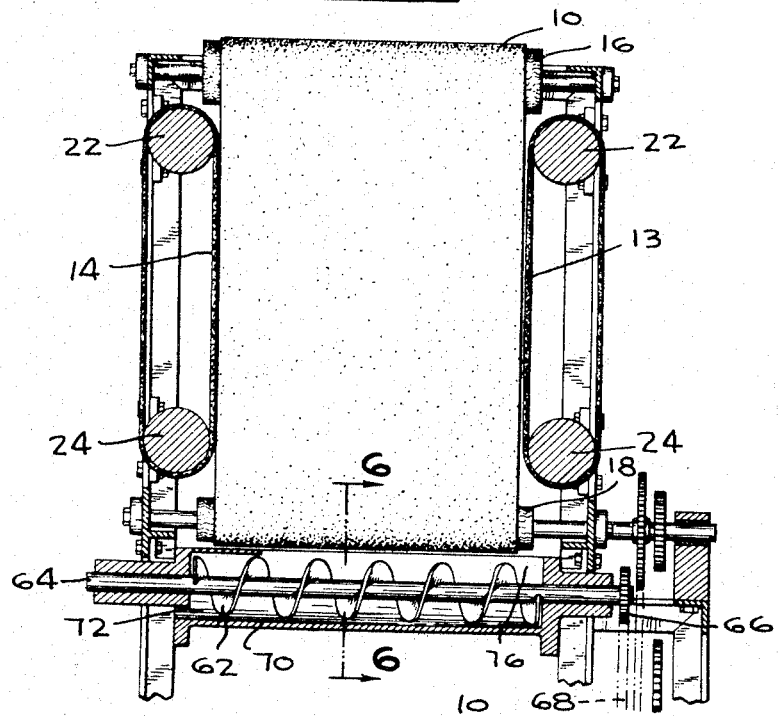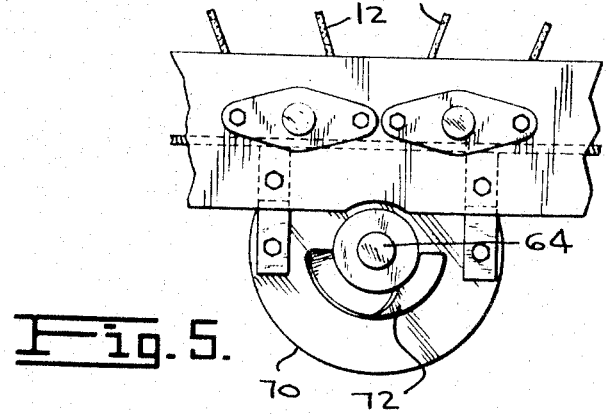

United States Patent Office 3,442,228
Patented May 6, 1969

3,442,228
AUTOMATIC DOUGH FEEDING MACHINE
Fausto Celorio, Cumbres de Acultzingo 185,
Mexico City, Mexico
Filed Mar. 24, 1967, Ser. No. 625,748
Int. Cl. A21c *11/16;* G01f *11/00*
U.S. Cl. 107—14                       2 Claims

ABSTRACT OF THE DISCLOSURE

A dough feeding apparatus having a hopper formed of vertically movable bands feeding dough to a driven screw conveyor which forces the dough through an extrusion opening.

Background of the invention

The present invention relates to a dough feeding machine, and more particularly, relates to a machine for automatically supplying dough to any suitable receiving system.

The machine according to the present invention functions to automatically supply dough to a suitable receiving system, and is applicable to devices such as, for example, machines for making "tortillas" (Mexican corn pancakes) or any other suitable type of machine utilizing dough as a raw material.

The dough processing machines of the conventional type normally have a storage capacity varying between 30 and 40 kg. Normally an automatic dough processing machine consumes the quantity aforementioned in a more or less short time. Consequently, the machines must be frequently reloaded. Apparently, the aforementioned problem could simply be resolved by augmenting the capacity of the hoppers that form part of the automatic machines; however, this produces problems which make the increase of the capacity of the hoppers impractical and undesirable. This is true because an increase of the capacity of the hopper in a dough processing machine aggravates the already existing problem of the variation in the dough pressure for a full hopper as compared with an almost empty hopper. In other words, when an automatic machine initiates its operation with its hopper charged with dough to its maximum capacity, the said dough would have to have a certain weight that causes a given pressure to be exerted on the bottom of the hopper. However, when the hopper is almost empty, the small quantity of dough will exert much less pressure. Consequently, the dimensions of the dough product extruded varies in accordance with the hopper load at the time of extrusion.

Summary of the invention

It is therefore, a primary object of this invention to provide a new and improved dough feeding means.

An additional object of this invention is the provision of a new and improved dough feeding means which provides a constant quantity of dough regardless of the amount of dough in said feeding means.

The objects of this invention are achieved by the provision of a hopper or storage means consisting of generally downwardly movable bands having a lower opening in which a screw conveyor is mounted. The movable bands are driven so as to continuously provide dough to the screw conveyor which is also driven to force the dough through an extrusion opening.

Brief description of the drawings

FIGURE 3 is a view of the upper plan.
FIGURE 4 is a side view of the upper part of the machine, with some of its portions eliminated, in order to show in a clearer manner its inner parts.
FIGURE 5 is a frontal view of the extrusion nozzle for the dough.
FIGURE 6 is a sectional view taken along lines 6—6 of FIGURE 4.

Description of the preferred embodiment

Figure 1:
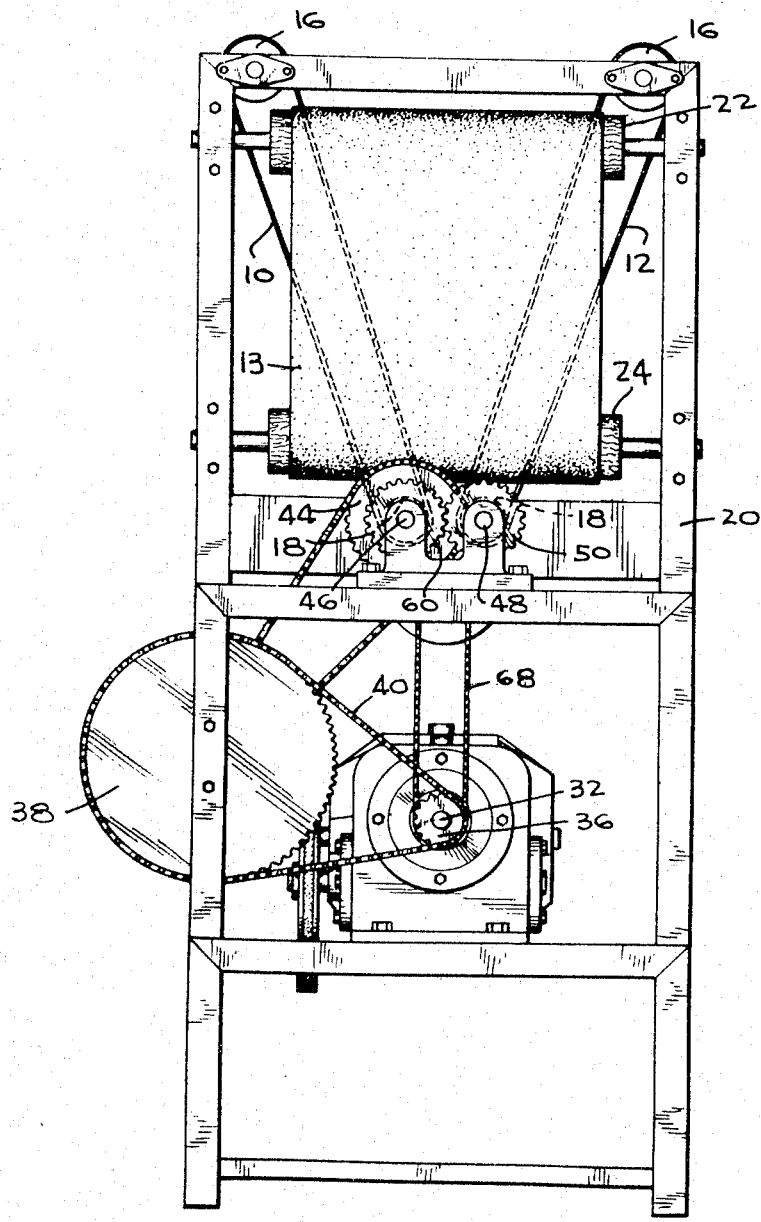
FIGURE 1 is a back view of the feeding machine of the present invention.

Referring to the drawings, and more particularly to FIGURES 1 and 3, the automatic dough feeding machine of this invention includes a deposit hopper or reservoir for the dough formed of four relatively wide movable belts 10, 12, 13 and 14. Belts 10 and 12 are mounted on upper idler rollers 16 and lower driven rollers 18 which are in turn journaled on the machine frame 20 in positions so that belts 10 and 12 are oriented at an angle with respect to the vertical as shown in FIGURE 1. Belts 13 and 14 are supported by upper and lower idler rollers 22 and 24 respectively which are located in a vertical plane shown in FIGURE 4. Belts 10, 12, 13 and 14 are positioned so that the surface of belts 13 and 14 is immediately adjacent the respective edges of belts 10 and 12 as shown in FIGURES 3 and 4. The inwardly facing surfaces of the belts define the side walls of the hopper.

Figure 2:
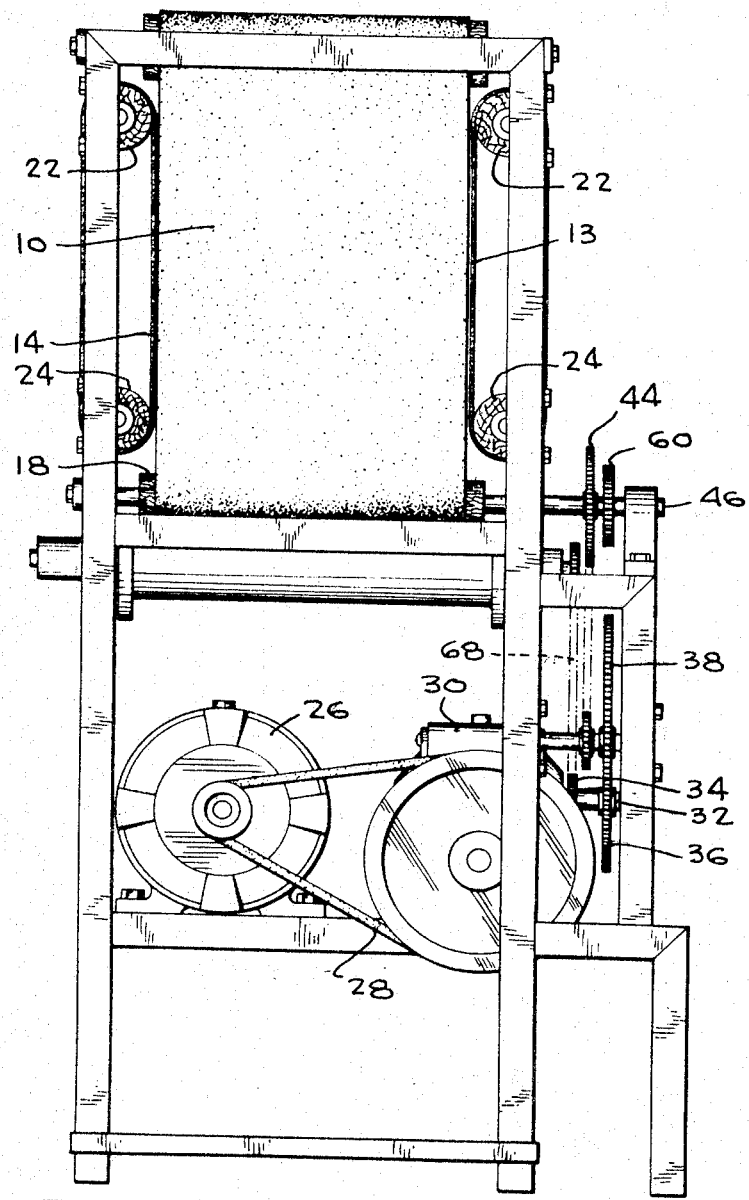
FIGURE 2 is a side view of the feeding machine.

Drive means for belts 10 and 12 comprises an electric motor 26 (FIG. 2) which drives a drive belt 28 connected to the input of a step-down transmission 30. The output shaft 32 of step-down transmission 30 has first and second sprockets 34 and 36 fixed thereto. A large sprocket 38 is journaled for rotation on frame 20 and a drive chain 40 extends between sprocket 36 and sprocket 38. A small sprocket 42 is mounted on the same shaft as sprocket 38 and drives a roller sprocket 44 which is attached to a shaft 46 upon which the lefthand driven roller 18 is mounted as shown in FIGURE 1. Righthand roller 18 is mounted on shaft 48 and has a gear 50 fixed thereto which meshes with a gear 60 on shaft 46. Motor 26 is driven in a direction that will cause the inwardly facing portions of belts 10 and 12 to move downwardly as viewed in FIGURE 1. This downward movement effectively constitutes downward movement of the hopper walls formed by belts 10 and 12.

A rotary screw conveyor 62 is mounted on a shaft 64 for rotation and a sprocket 66 is affixed to shaft 64 and is driven by a chain 68 extending from sprocket 34. Screw conveyor 62 is surrounded by a housing 70 and has an extrusion nozzle opening 72 in its left end as viewed in FIGURE 4 and is also open at the top as shown in FIGURES 4 and 6. Rollers 18 are spaced apart a sufficient distance to define an exit passage 76 from the hopper formed of belts 10, 12, 13 and 14. Movement of these belts forces the dough down into housing 70. Rotation of the screw conveyor 62 forces the dough out of the machine by way of extrusion nozzle 72 in an obvious manner.

The operation of the apparatus is very simple in that dough is placed within the hopper formed by the inwardly facing surfaces of belts 10, 12, 13 and 14. Belts 10 and 12 are driven and force the dough downwardly through exit passage 76 into housing 70 to be engaged by the rotating screw conveyor 62. Rotation of the screw conveyor extrudes the dough through extrusion nozzle 72 in an obvious manner. The downward motion of the inwardly facing surfaces of driven belts 10 and 12 obviously causes the dough to be moved downward and the fact that the dough is engaged with idler belts 13 and 14 also causes the inwardly facing surfaces of idler belts 13 and 14 to also move downwardly.

While a preferred embodiment of the invention has been illustrated, it should be understood that various modifications are contemplated and may obviously be resorted to by those skilled in the art without departing from the spirit and scope of the invention as hereinafter defined in the appended claims.

I claim:
1. An automatic dough feeding machine comprising: a deposit hopper for the dough having a pair of opposed inwardly facing walls formed of the inner runs of a pair of driven endless belts each mounted on an upper and lower roller, drive means for drivingly moving said inner runs of said belts downwardly, said drive means comprising an electric motor driving a step-down transmission through a belt, a pair of toothed output wheels on said transmission, a screw conveyor means beneath said deposit hopper receiving dough from the deposit hopper for conducting the dough through an extrusion nozzle, a toothed input drive wheel for said conveyor, one toothed wheel of said pair of toothed output wheels on said transmission driving said toothed input drive wheel of the conveyor means through a chain, wherein the other toothed output wheel on the transmission drives a first toothed wheel of a pair of toothed wheels located on an independent shaft, the said first toothed wheel on said independent shaft rotating the said independent shaft and consequently rotating the second one of said pair of toothed wheels on said independent shaft, the second toothed wheel of the independent shaft driving by means of a chain a larger diameter toothed wheel drivingly connected to the lower roller of one of the said belts, and a gear also associated with the said one lower roller engaging a gear on the lower roller of the other belt to downwardly drive the inner run of the said other belt.

2. The invention of claim 1 wherein said hopper additionally includes first and second opposite roller supported idler belts having inner runs forming a pair of spaced opposed walls between the walls formed of the inner runs of said driven belts.

References Cited

UNITED STATES PATENTS

| 261,339 | 7/1882 | Grove. | |
| 560,718 | 5/1896 | Hueg | 107—14 |
| 660,901 | 10/1900 | Jenkins | 107—10 |
| 2,712,291 | 7/1955 | Groff | 107—14 |
| 3,001,485 | 9/1961 | Czik | 107—14 |

FOREIGN PATENTS

| 455,982 | 5/1928 | Germany. |
| 490,353 | 1/1930 | Germany. |
| 25,285 | of 1908 | Great Britain. |

ROBERT B. REEVES, *Primary Examiner.*